(12) United States Patent
Stresing (10) Patent No.: US 10,693,225 B2
(45) Date of Patent: Jun. 23, 2020

(54) RADOME STRUCTURE, PROTECTED RADIATION-ACTIVE SYSTEM AND METHODS FOR USING THE SAME

(71) Applicant: Saint-Gobain Performance Plastics Corporation, Solon, OH (US)

(72) Inventor: David Winfield Stresing, Kent, OH (US)

(73) Assignee: Saint-Gobain Performance Plastics Corporation, Solon, OH (US)

( * ) Notice: Subject to any disclaimer, the term of this patent is extended or adjusted under 35 U.S.C. 154(b) by 0 days.

(21) Appl. No.: 16/147,083

(22) Filed: Sep. 28, 2018

(65) Prior Publication Data
US 2019/0103668 A1 Apr. 4, 2019

Related U.S. Application Data

(60) Provisional application No. 62/566,384, filed on Sep. 30, 2017.

(51) Int. Cl.
*H01Q 1/42* (2006.01)
*B32B 7/12* (2006.01)
(Continued)

(52) U.S. Cl.
CPC ............ *H01Q 1/422* (2013.01); *B32B 3/12* (2013.01); *B32B 5/02* (2013.01); *B32B 7/12* (2013.01);
(Continued)

(58) Field of Classification Search
CPC . H01Q 1/422; H01Q 1/42; B32B 3/12; B32B 5/02; B32B 7/12; B32B 27/06; B32B 2307/204
See application file for complete search history.

(56) References Cited

U.S. PATENT DOCUMENTS

| 5,408,244 A | 4/1995 | Mackenzie |
| 6,028,565 A | 2/2000 | Mackenzie |

(Continued)

FOREIGN PATENT DOCUMENTS

WO 2010051468 A2 5/2010

OTHER PUBLICATIONS

Y. Huang, "Understanding the Effects of Coating on Antennas," invited talk at MICS (2006).
(Continued)

*Primary Examiner* — Graham P Smith
(74) *Attorney, Agent, or Firm* — McDonnell Boehnen Hulbert & Berghoff LLP (57) ABSTRACT

The present disclosure relates generally to a layered structure for a radome for use with radiation of a free space frequency. The present disclosure relates more particularly to a layer structure for a radome having a core with an inside surface and an exposed outside surface. The core includes a first core layer having a first relative permittivity of at least 2.3 and a second core layer having a second relative permittivity of at least 2.3. The first core layer is no more than 0.75 mm from the outside surface of the core. An inner structure is disposed on the inside surface of the core and has at least one layer. Each of the first relative permittivity and second relative permittivity is at least 0.4 greater (e.g., at least 0.7 greater, at least 1 greater, or at least 1.3 greater) than a relative permittivity of any layer in the inner structure.

20 Claims, 5 Drawing Sheets

(51) Int. Cl.
 B32B 5/02 (2006.01)
 B32B 27/06 (2006.01)
 B32B 3/12 (2006.01)
(52) U.S. Cl.
 CPC ........ B32B 27/06 (2013.01); B32B 2307/204 (2013.01)

(56) References Cited

U.S. PATENT DOCUMENTS

| | | |
|---|---|---|
| 6,323,825 B1 | 11/2001 | Zidek |
| 7,463,212 B1 | 12/2008 | Ziolkowski |
| 8,587,496 B1 | 11/2013 | Peters |
| 8,760,359 B2 | 6/2014 | Sato |
| 8,917,220 B2 | 12/2014 | Ziolkowski |
| 9,099,782 B2 | 8/2015 | Ziolkowski |
| 2004/0219851 A1 | 11/2004 | Sahlin |
| 2012/0070691 A1 | 3/2012 | Graf |
| 2012/0188145 A1 | 7/2012 | Sato |
| 2013/0002514 A1 | 1/2013 | Ziolkowski |
| 2014/0327595 A1 | 11/2014 | Van Oosterbosch |
| 2015/0022423 A1 | 1/2015 | Johnson |
| 2015/0255862 A1 | 9/2015 | LoRe |
| 2015/0263417 A1 | 9/2015 | Kim |
| 2016/0172748 A1 | 6/2016 | Keen |
| 2016/0233578 A1 | 8/2016 | Kume |
| 2017/0008251 A1 | 1/2017 | Pruett |

OTHER PUBLICATIONS

Competition Composites Inc., "Radome R&D White Paper," Aug. 2013.
L. Griffiths et al., "A Fundamental and Technical Review of Radomes," MP Digest (May 2008).
International Search Report and Written Opinion in PCT/US2018/0253576, dated Feb. 1, 2019.

RADOME STRUCTURE, PROTECTED RADIATION-ACTIVE SYSTEM AND METHODS FOR USING THE SAME

CROSS-REFERENCE TO RELATED APPLICATIONS

This application claims the benefit of priority of U.S. Patent Provisional Application no. 62/566384, filed Sep. 30, 2017, which is hereby incorporated herein by reference in its entirety.

BACKGROUND OF THE DISCLOSURE

1. Field of the Disclosure

The present disclosure relates generally to radomes, suitable, for example, for enclosing antennas. The present disclosure relates more particularly to lightweight layered radome structures having broadband capability.

2. Technical Background

A radome is a structural element that provides a protective cover for a radiation-active device, such as an antenna, which shields the radiation-active device from weather and other environmental impacts. The primary design constraints of a radome include both sufficient structural integrity to protect the radiation-active device from harsh environmental conditions, and a construction that limits the signal loss caused by the radome so as to prevent significant interference with the electromagnetic performance of the antenna enclosed within its volume. Shape can also be an important characteristic, as the location of the radome may require certain shape constraints while the shape will also impact the radome's performance. For example, aerodynamics is often a consideration when installing a radome on an aircraft.

The basic construction of many radomes is a shell that covers the protected device, with the thin shell being configured with electromagnetic properties that allowing a signal of a desired frequency or frequencies to pass through the radome to and/or from the device. The shell is typically composed of a layer structure having one or more layers of dielectric material, selected so as to limit loss as the signal passes through the radome. The performance of the layered structure is based on a number of characteristics including the relative permittivity of the layers, the thicknesses of the layers in relation to the wavelength of the signal, and the number and composition of layers.

One construction of the layered radome structure having broadband capabilities includes a core structure that provides structural integrity, and matching layers on both the inner and outer sides of the core structure that enhance the electrical performance of the radome. While such a structure has limited signal loss and limited interference with the signals being received or emitted by the radiation-active device, the layers can add significant weight to the radome as a whole.

What is needed is an effective radome structure that is lightweight but has broadband capability.

SUMMARY OF THE DISCLOSURE

In one aspect, the present disclosure provides a layer structure of a radome for use with radiation of a free space frequency, the layer structure having an exposed outer surface and an inner surface, the layer structure comprising
a core having an inside surface and an outside surface, the outside surface of the core being within 0.75 mm of the exposed outside surface of the layer structure of the radome, the core including a first core layer having a first relative permittivity of at least 2.3 and a second core layer having a second relative permittivity of at least 2.3, the first core layer defining the outside surface of the core and the second core layer defining the inside surface of the core, and an intermediate core layer between the first core layer and the second core layer; and
an inner structure disposed on the inside surface of the core, the inner structure having an outside surface abutting the core and an inside surface that is exposed, the inner structure including at least one layer, wherein each of the first relative permittivity and second relative permittivity is at least 0.4 greater (e.g., at least 0.7 greater, at least 1 greater, or even at least 1.3 greater) than a relative permittivity of any layer in the inner structure.

In another aspect, the disclosure provides a layer structure for a radome for use with radiation of a free space frequency, the layer structure comprising
a core having an inside surface and an outside surface, the core including a first core layer having a first relative permittivity of at least 2.3 and a second core layer having a second relative permittivity of at least 2.3, the first core layer being adjacent the outside surface of the core and the second core layer being adjacent the inside surface of the core; and
an inner structure disposed on the inside surface of the core, the inner structure having an outside surface abutting the core and an inside surface that is exposed, the inner structure including at least one layer, wherein each of the first relative permittivity and second relative permittivity is at least 0.4 greater (e.g., at least 0.7 greater, at least 1 greater, or even at least 1.3 greater) than a relative permittivity of any layer in the inner structure,
wherein no layer having a thickness of at least 0.75 mm is disposed on the outside surface of the core.

In another aspect, the present disclosure provides a radome for use with radiation of a free space frequency, the radome comprising an enclosed three-dimensional shape with an exposed convex outer surface and an exposed concave inner surface, the enclosed three-dimensional shape including at least one layer structure as described herein.

In another aspect, the present disclosure provides a method for transmitting radiation of a free space frequency, comprising
positioning a radome as described herein to cover a radiation-active device; and
operating the radiation-active device to transmit radiation of the free space frequency through the layer structure.

In another aspect, the disclosure provides a method for receiving radiation of a free space frequency, comprising
positioning a radome as described herein to cover a radiation-active device; and
receiving radiation of the free space frequency through the radome structure by the radiation-active device.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

The present inventor has noted that the use of matching layers on both the inner side and outer side of the core structure of a radome can undesirably add weight to the radome structure. The present inventor has unexpectedly determined that the use of additional layers with low relative permittivity only on the inner side of the core structure can achieve significantly reduced weight while still providing acceptable electromagnetic performance.

Figure 7:
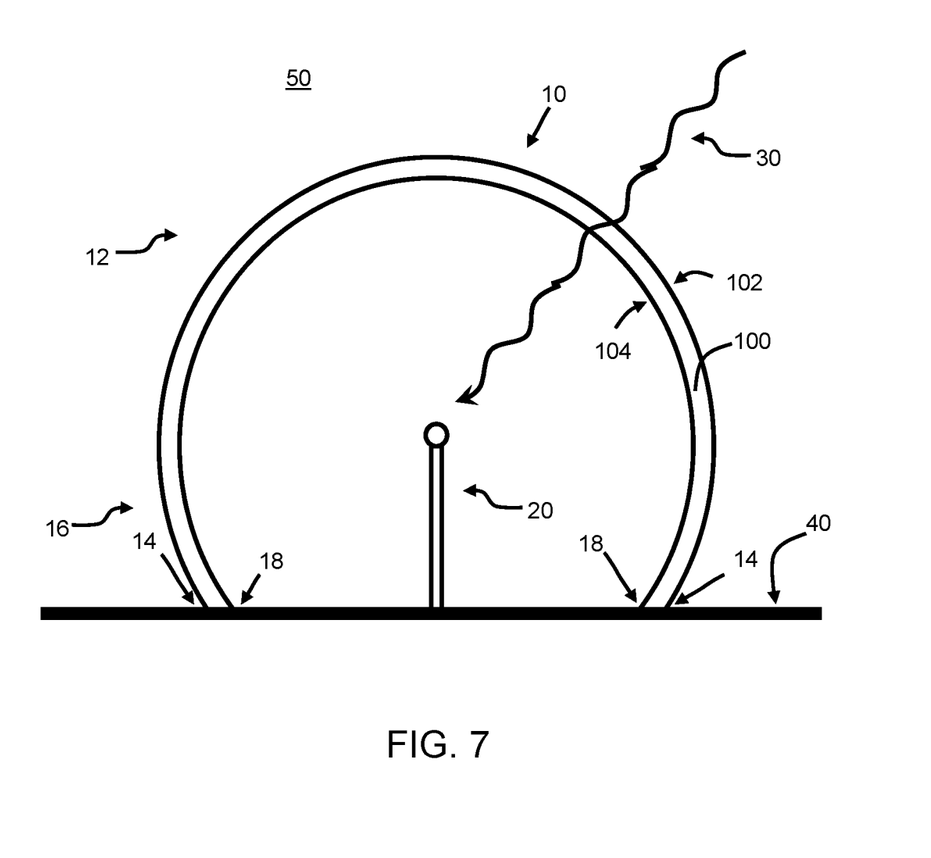
FIG. 7 is a schematic representation of a radome disposed over a radiation-active device in accordance with an embodiment of the disclosure.

Accordingly, one aspect of the disclosure is a layer structure of a radome for use with radiation of a free space frequency. The layer structure has a core and an inner structure, where the core is adapted for placement on an outer side of the radome and the inner structure is disposed on the inner side of the radome. One embodiment of such a layer structure is shown in cross-sectional schematic view in FIG. 1. Layer structure 100 includes an exposed outer surface 102 and an inner surface 104. When in use in a radome that covers a radiation-active device, as illustrated in FIG. 7 (described below), the inner surface 104 faces the radiation-active device while the surface 102 faces away from the radiation-active device, and is exposed to the atmosphere. Layer structure 100 is composed of a core 110 and an inner structure 150. The core 110 has an outside surface 112 that is within 0.75 mm of the exposed outer surface 102 of the layer structure; in the embodiment of FIG. 1, outside surface 112 of the core 110 forms the outer surface 102 of the layer structure. The core also has an inside surface 114 that is adjacent to the inner structure 150. Specifically, inside surface 114 of the core abuts an outside surface 152 of the inside structure 150. Opposite the core 110, the inner structure 150 has an inside surface 154 that forms the inner surface 104 of the layer structure.

Figure 1:
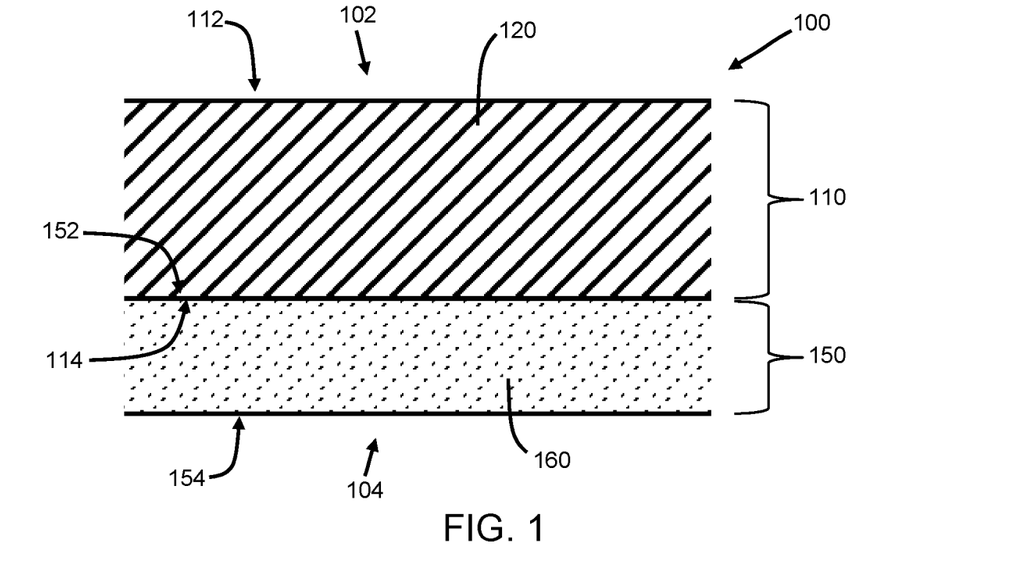
FIG. 1 is a cross-sectional schematic view of a portion of a layer structure for a radome according to one embodiment of the disclosure.

It will be understood by a person of ordinary skill in the art that the outer surface 102 and the inner surface 104 of the layered structure are at the extremities of the cross section of the layer structure 100. Thus, these surfaces are adapted to form the outermost and innermost surfaces of the radome and be exposed surfaces. For example, in a constructed radome, the outer surface of the layer structure can be exposed to the surrounding air or ambient environment. Likewise, the inner surface of the layer structure may also be exposed to the ambient environment. Alternatively, if the radome is sealed, the inner surface may be exposed to pressurized air or another gas enclosed within the radome.

In the basic construction shown in FIG. 1, the core 110 is formed of a single core layer 120 and the inner structure 150 is also formed of a single inner layer 160. In this embodiment, the core layer 120 has a relative permittivity of at least 2.3 and the inner layer 160 has a relative permittivity less than that of the core layer 120. In particular, the inner layer 160 may have a relative permittivity that is at least 0.4 less than the relative permittivity of the core layer 120.

In the example embodiment of FIG. 1, the core 110 provides the rigidity and strength for use of the layer structure in the radome. To provide this structural integrity, at least one layer within the core may be of a greater density and strength than other layers of the structure. Here, in the embodiment of FIG. 1, the core layer 120 has a high relative permittivity and also provides the structural integrity of the core. As such, core layer 120 may be denser than other layers in the layer structure 100.

Example materials that may be used for core layer 120 include laminate structures including a resin, for example, an epoxy, polyester or polycyanate. Optionally, the resin may include a reinforcement component such as E-Glass, S-Glass, D-Glass, spectra, Kevlar or Quartz. In certain embodiments, the core layer 120 may include a plurality of plies of resin-impregnated fabric.

It may be understood to a person of ordinary skill in the art that the core layer 120 in FIG. 1 is identified as a single layer based on the consistency of the material present throughout the layer and the layer's relatively uniform material characteristics across its cross section. However, it should also be understood by a person of ordinary skill in the art that core layer 120 may be formed from a plurality of plies of fibrous or other materials impregnated with resin. Thus, while the core layer 120 could be viewed as multiple layers when it is formed of a laminate or similar material, the core layer 120 is considered here as a single layer based on the consistency of material characteristics throughout the layer, especially when considered on the scale of the wavelength of the radiation. Many radomes are configured to be used with radiation having a wavelength on the scale of a millimeter, and so disuniformities in permittivity of the material on the scale of substantially less than a millimeter will not be sensed by such radiation. The other layers may similarly be characterized as a single layer even if they are formed from multiple plies of a particular material.

As stated above, the relative permittivity of inner layer 160 is less than that of the core layer 120. Possible materials for inner layer 160 include a honeycomb structure, a laminate with a high modulus polypropylene (HMPP) fabric, a laminate with a polyethylene fabric, and a syntactic film. The inner layer 160 may also be formed of a resin that includes a permittivity-reducing material, where the resin has a high relative permittivity that is reduced to a desired value with the addition of a permittivity-reducing material. For example, the resin could include air-filled microspheres to reduce the relative permittivity. A wide variety of low permittivity materials are known in the art. The person of ordinary skill in the art will select appropriate materials for use as low-permittivity layers of the layered structure of the radome.

In addition to having a lower relative permittivity than the core layer 120, the inner layer 160 may also have a lower density than core layer 120. With the core structure 110 providing the structural integrity of the corresponding radome, the inner structure 150 can be less dense and rely on the core structure 110 for support.

As will be evident to those of ordinary skill in the art, the inner layer 142 may act as a so-called matching layer to improve the overall electromagnetic performance of the layer structure 100 when used in a radome. In particular, the inclusion of the inner layer 142 within inner structure 150 can in certain desirable embodiments provide increased transmission efficiency and/or an operational range with a broader band of frequencies.

In an embodiment of the present disclosure, layer structure 100 is shown in use within a radome 10 in FIG. 7. Here, the radome 10 encloses radiation-active device 20, which may be, for example, a radar antenna or other antenna. In such a location, the radiation-active device 20 is protected from the surrounding environment 50, in particular from any hazardous weather or wind. In the illustrated embodiment, the radome 10 is formed in a three dimensional concave shape. The radiation-active device 20 is positioned inside the interior of the concave shape so that device 20 is enclosed within the radome but a signal 30 may still pass through the radome with limited signal loss from a variety of different angles. Due to the three-dimensional shape of radome 10, the inner surface 104 of layer structure 100 that faces the radiation-active device 20 is a concave surface. Likewise, in the illustrated construction, the outer surface 102, which faces away from radiation-active device 20, is a convex surface. Alternatively, in some embodiments, such as a planar radome, the layer structure 100 may be flat. While the radome in FIG. 7 appears as a single layer structure forming the three-dimensional radome shape, it is also possible that the radome be formed by a plurality of panels of layer structures that are connected by joints, as is familiar to the person of ordinary skill in the art.

When the radome 10 has a three-dimensional concave shape, as shown in FIG. 7, the radome may include a closed end 12 and an open end 16. In such an embodiment, the radiation-active device 20 may extend into the concave shape of the radome 10 through the open end 16. To ensure protection of the radiation-active device or antenna 20, the radome 10 is preferably attached to a support structure 40. For example, with a stationary radiation-active device, the support structure 40 may be embodied as the ground or the roof of a building. Likewise, a radome used in aviation may be attached to the skin of an airplane that acts as the support structure. In some embodiments, the radome 10 attaches to the support structure by a peripheral edge 14 that surrounds the opening at the open end 16 of the radome 10. In certain applications it is particularly advantageous if a seal 18 is created between the peripheral edge 14 of the radome opening and the support structure 40. This seal may be formed by a tight connection between the radome edge 14 and the support structure 40, or it may be embodied by a seal structure disposed between the peripheral edge 14 and the support structure 40.

Figure 2:
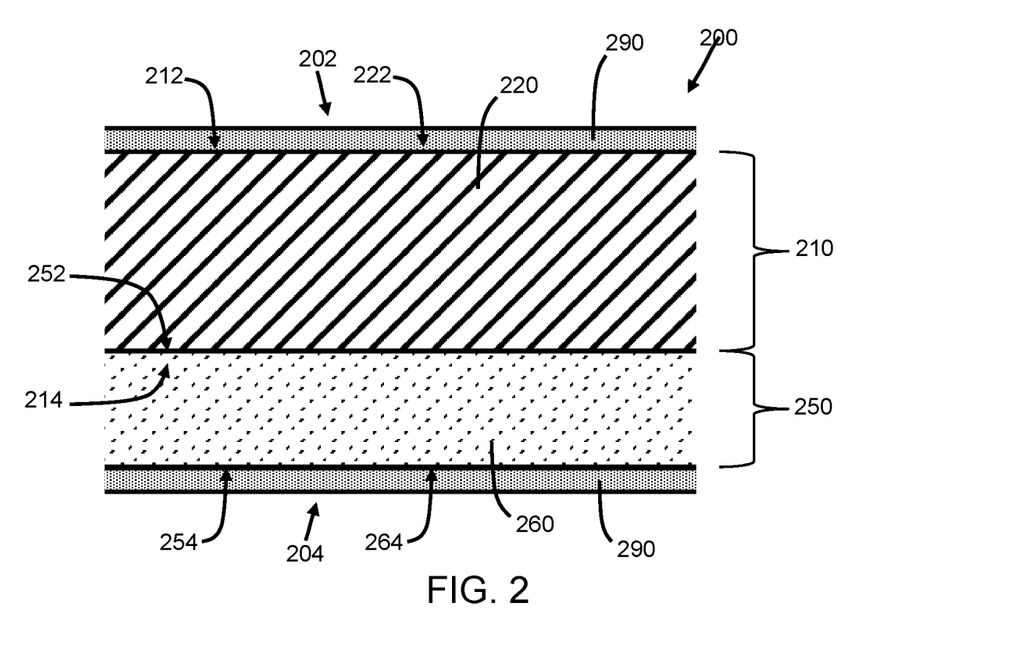
FIG. 2 is a cross-sectional schematic view of a portion of a layer structure of a radome according to another embodiment of the disclosure.

In the embodiment of FIG. 1, the outside surface of the core forms the outer surface of the layered structure, and the inside surface of the inner structure forms the inner surface of the layer structure. But the person of ordinary skill in the art will appreciate that these surfaces can, in some embodiments, be painted or otherwise coated to provide, e.g., environmental protection or aesthetic benefit. FIG. 2 shows another example embodiment of a layer structure for a radome in accordance with the present disclosure. Similar to layer structure 100, layer structure 200 has an outer surface 202 and an inner surface 204, and includes a core 210 and an inner structure 250. In addition to the core and the inner structure, the layered structure 200 also includes a thin coating 290 on the outside surface of the core 212. Accordingly, the coating 290 on the core forms the outer surface 202 of the entire layer structure 200.

The example embodiment in FIG. 2 also includes a coating 290 disposed on the inside surface 254 of the inner structure 250. This inner coating 290 thus forms the inside surface 254 of the inner structure 250.

The coating 290 may be composed of a paint that is applied on the inner and outer surfaces of the layer structure. The coating 290 may also include other coatings, including conventional coatings, for example, a primer coating, an antistatic coating, a surface coating that fills imperfections or a film adhesive that reduces imperfections in the radome surface. Some embodiments may include combinations of coatings. The person of ordinary skill in the art can use conventional coating systems in the radome structures of the present disclosure.

The one or more coatings on the outside surface of the core layer is no greater than 0.75 mm thick (i.e., such that the outside surface of the core is within 0.75 mm of the outer surface of the layered structure). In certain embodiments, the outside surface of the core is within 0.25 mm of the outer surface of the layered structure); in such embodiments, the coating(s) may be no more than 0.25 mm thick. It is conceivable that a coating 290 is disposed only at the outer surface of the layer structure 200. For example, a coating may be unnecessary within the protected and generally not-visible environment inside the radome, and paint may be unnecessary as the inner surface of the layered structure would generally not be visible to an observer when installed. However, in other embodiments, and as shown in FIG. 2, one or more coatings are provided at the inner surface of the layered structure (i.e., on the inside surface of the inner structure). In certain desirable embodiments, the inside surface of the inner structure is within 0.75 mm, or even within 0.25 mm of the inner surface of the layered structure. In such embodiments, the total coating thickness at the inner surface of the layered structure is similarly limited.

Although illustrated only in FIG. 2 of the drawings, a coating may be provided at the outer and inner surface of any embodiment of the layer structure of the present disclosure, including the layer structures illustrated in FIGS. 3-6.

The inner structure can be formed in a variety of thicknesses. For example, in certain embodiments, the inner structure has a thickness of at least 0.25 mm, at least 0.75 mm, or even at least 1 mm. In other embodiments, the inner structure has a thickness of at least 2 mm, or even at least 5 mm.

The layered structures are shown in the figures with the core in direct contact with the inner structure. As the person of ordinary skill in the art will appreciate, the materials of the core and the bulk of the inner structure can be directly laminated to one another. But in other embodiments, a layer of adhesive can bond the inner structure to the core; the person of ordinary skill in the art will appreciate that an adhesive can be selected with a sufficiently low permittivity and/or of sufficient low thickness that it is properly itself considered part of the inner structure. In such a case, the inner structure would include a coating of adhesive disposed at and forming its outside surface.

The person of ordinary skill in the art will appreciate that the patterns used in the cross sections shown FIGS. 1-6 are intended only for distinguishing one layer from the next. The similarity of patterns used to illustrate layers from one figure to the next is not indicative of any similarity of material characteristics of these layers. If there is a similarity between layers from different depicted embodiments, such similarities are explained in the text.

Figure 3:
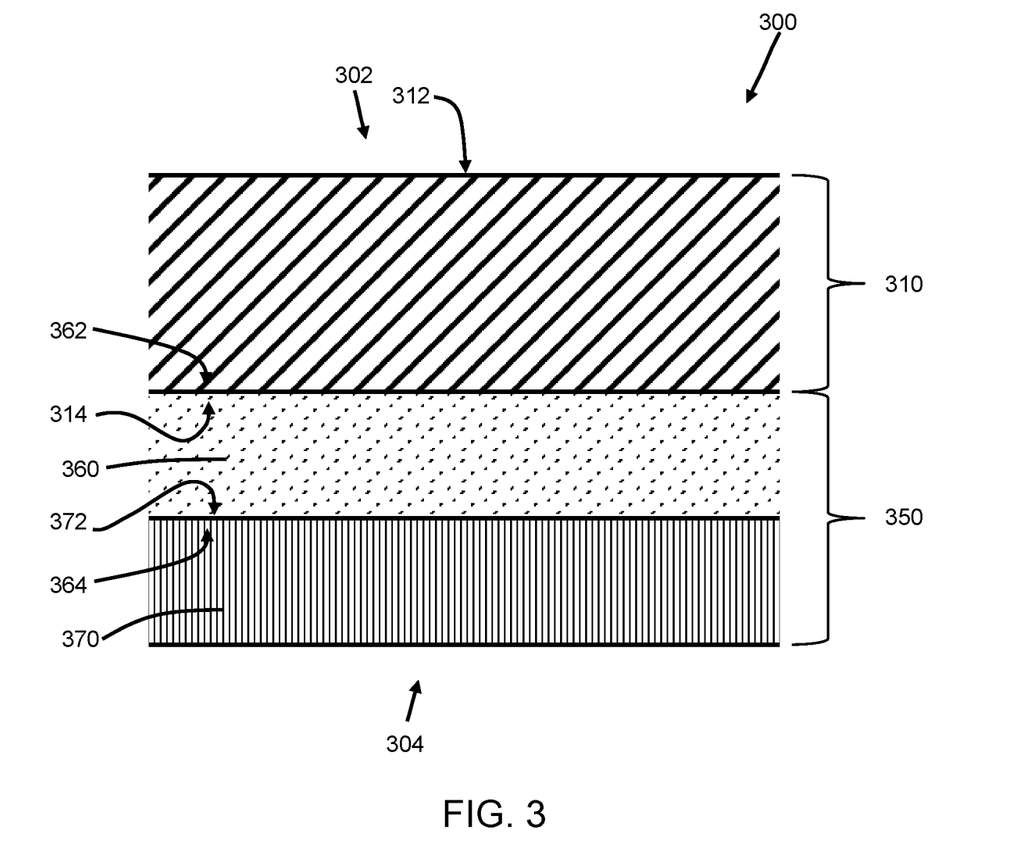
FIG. 3 is a cross-sectional schematic view of a portion of a layer structure of a radome according to another embodiment of the disclosure.

FIG. 3 illustrates another embodiment of the present disclosure, showing a layer structure 300. Similar to the embodiment of FIG. 1, the layer structure 300 includes a core 310 with a single core layer 320. Here again, core layer 320 forms the outer surface 302 of the layer structure as well as the outside surface 312 of the core 310. Further, core layer 320 again has a relative permittivity of at least 2.3. The inner structure 350 of layer structure 300 includes both a first inner layer 360 and a second inner layer 370. First inner layer 360 is disposed adjacent to core 310 and the outside surface 362 of first inner layer 360 is fixed against the inside surface 314 of core layer 310. Further inward, the outside surface 372 of the second inner layer 370 is fixed against the inside surface 364 of first inner layer 360, and the inside surface 374 of second inner layer 370 is exposed, thereby forming the inner surface 304 of the layer structure 300. Both of the inner layers are preferably formed of material having a relative permittivity substantially below that of the core layer 310. For example, the relative permittivity of both inner layers (indeed, of all inner layers) is at least 0.4 less (e.g., at least 0.7 less, at least 1 less, or at least 1.3 less) than that of the core layer 310.

Here, too, a wide variety of low permittivity materials are known in the art, and the person of ordinary skill in the art will select appropriate materials for use as low-permittivity layers of the inner structure of the radome. Thus, possible materials for inner layers 360 and 370 include a honeycomb structure, a laminate with a high modulus polypropylene (HMPP) fabric, a laminate with a polyethylene fabric, a syntactic film, or a resin with or without a permittivity reducing material. In one particular embodiment the relative permittivity of the first inner layer 360 is higher than the relative permittivity of the second inner layer 370. For example, the relative permittivity of the first inner layer may be at least 0.4 greater (e.g., at least 0.5 greater) than the relative permittivity of the second inner layer 360. Preferably, the relative permittivity of both layers 360, 370 of the inner structure 350 are lower than the relative permittivity of the core. Thus, the relative permittivity of the layers of layer structure 300 is ever decreasing from the outside surface 302 to the inside surface 304. It is also possible for the relative permittivity of the first inner layer 360 to be lower than that of the second inner layer 370.

Figure 4:
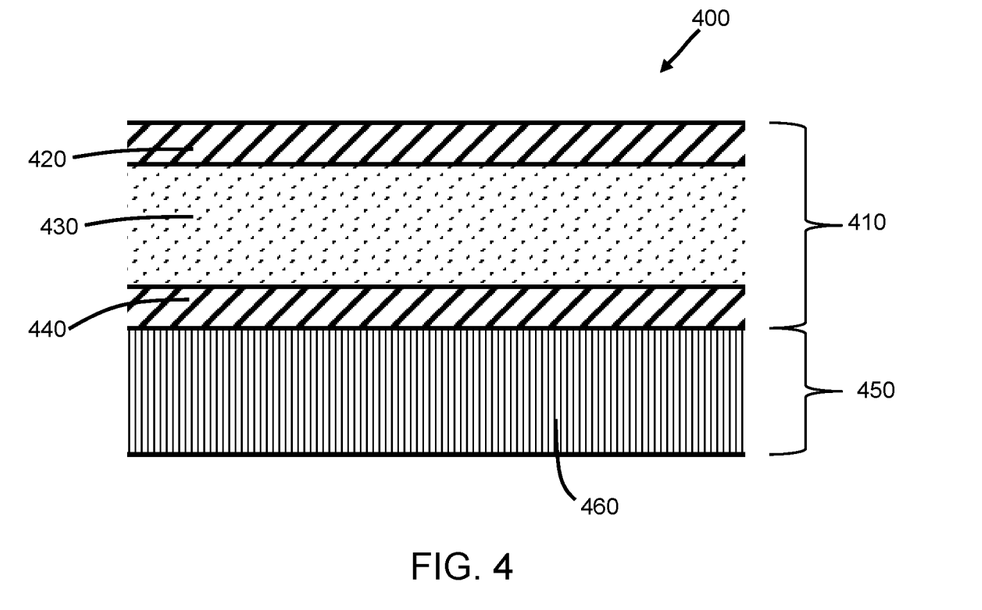
FIG. 4 is a cross-sectional schematic view of a portion of a layer structure of a radome according to yet another embodiment of the disclosure.

FIG. 4 shows another embodiment of the present disclosure including a core 410 and an inner structure 450. In this embodiment, the core 410 includes a first core layer 420 at the outer surface 402 of the layer structure 400 and a second core layer 440 adjacent to the inner structure 450. An additional layer, intermediate core layer 430 is disposed between first and second core layers 420, 440. Preferably, each of the first and second core layers 420, 440 has a relative permittivity of at least 2.3 (e.g., at least 2.5, for example, in the range of 2.5 to 5) and the relative permittivity of the inner layer 460 is less than that of the first and second core layers 420, 440 (e.g., by at least 0.4, or even at least 0.7, at least 1, or at least 1.3). A wide variety of high-permittivity materials for use in radomes are known in the art, and the person of ordinary skill in the art will select appropriate high-permittivity material(s) for use in the structures described herein. For example, materials that may be used for first and second core layers 420, 440 include a resin, for example, an epoxy, polyester or polycyanate. Optionally, the resin may include a reinforcement component such as E-Glass, S-Glass, D-Glass, spectra, Kevlar and quartz. Alternatively, the core layers 420, 440 may include one or more plies of resin-impregnated fabric. In the illustrated embodiment of FIG. 4, the first and second core layers have the same characteristics, and thus the same relative permittivity.

Although the inner structure in FIG. 4 is shown with only a single layer, it is also possible for the inner structure 450 to include multiple layers, similar to inner structure 350 in FIG. 3. Preferably, if the inner structure 450 includes more than one layer, the relative permittivity of each of the first core layer 420 and the second core layer 440 is greater than any of the layers in the inner structure 450. In particular it is preferable if the relative permittivity of the first and second core layers 420, 440 is at least 0.4 greater (e.g., at least 0.7 greater, at least 1 greater, or at least 1.3 greater) than any of the layers in the inner structure 450. Possible materials for inner layer the layers of inner structure 450 include a honeycomb structure, a laminate with a high modulus polypropylene (HMPP) fabric, a laminate with a polyethylene fabric, a syntactic film, and a resin with a permittivity reducing material; the person of ordinary skill in the art will appreciate that other materials can be used.

The relative permittivity of intermediate layer 430 may be less than that of the first and second core layers 420, 440. In particular, the core shown in FIG. 4 may be formed as a so-called A-sandwich structure with two high-permittivity skins (e.g., layers 420 and 440) surrounding a low-permittivity core (e.g., 430). Here, the relative permittivity of the intermediate layer 430 is significantly less than that of the first and second core layers 420, 440, for example, at least 0.4 less or even at least 0.7 less, at least 1 less, or at least 1.3 less. The skins are desirably relatively thin, e.g., less than 1 mm thick, or even less than about 0.5 mm thick. To achieve especially desirable performance, the thickness of such an A-sandwich core may be about 0.25 of the wavelength of a characteristic signal to be received or transmitted from the radiation-activated device (i.e., of the wavelength associated with the free space frequency; the person of ordinary skill in the art will account for the refractive index of the material of the core at that frequency to determine the wavelength). For example, the thickness of the A-sandwich low-permittivity core layer in FIG. 4 could be in a range of 3/16 to 5/16, or 7/32 to 9/32 of the wavelength (i.e., in the material of the low-permittivity core layer) of a characteristic signal to be received or transmitted from the corresponding radiation-activated device. In certain embodiments, the thickness of the A-sandwich core is at least 1 mm, e.g., in the range of 1 mm to 100 mm.

The relative permittivity of the intermediate layer 430 may be greater than or less than the relative permittivity of the layer (e.g., 460) or layers within the inner structure 450. Here, too, a wide variety of low permittivity materials are known in the art, and the person of ordinary skill in the art will select appropriate materials for use as the low-permittivity core of the A-sandwich. Thus, possible materials for the intermediate layer 430 include a honeycomb structure, a laminate with a high modulus polypropylene (HMPP) fabric, a laminate with a polyethylene fabric, (UHMWPE), a syntactic film, and a resin with a permittivity reducing material.

In the illustrated embodiment of FIG. 4, the first core layer 420 forms the exposed outer surface 402 of the layer structure. However, it is also possible that the first core layer be near the outer surface 402, and, for example, covered by paint or some other coating. For example, the first core layer 420 may be disposed no more than 0.75 mm from the outer surface 402, or more preferably no more than 0.25 mm from the outer surface 402 so as to provide space for a coating that covers the first core layer 420.

Figure 5:
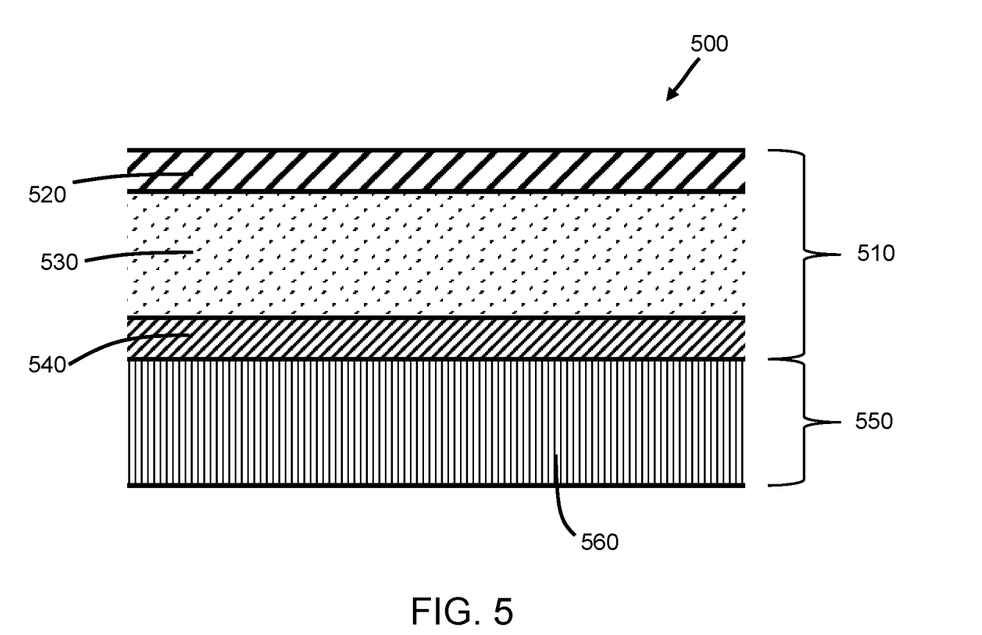
FIG. 5 is a cross-sectional schematic view of a portion of a layer structure of a radome according to another embodiment of the disclosure.

FIG. 5 shows an embodiment similar to that in FIG. 4. However, the second core layer 540 in FIG. 5 differs from the first core layer 520. For example, the relative permittivity of second core layer 540 may be higher than the relative permittivity of core layer 520. In such a case, the relative permittivity of each of the first and second core layers 520, 540 is at least 2.3 (e.g., at least 2.5, or in the range of 2.5 to 5), and moreover is greater than the relative permittivity of any layer in the inner structure 550 (e.g., by at least 0.4, or even at least 0.7, at least 1, or at least 1.3).

Figure 6:
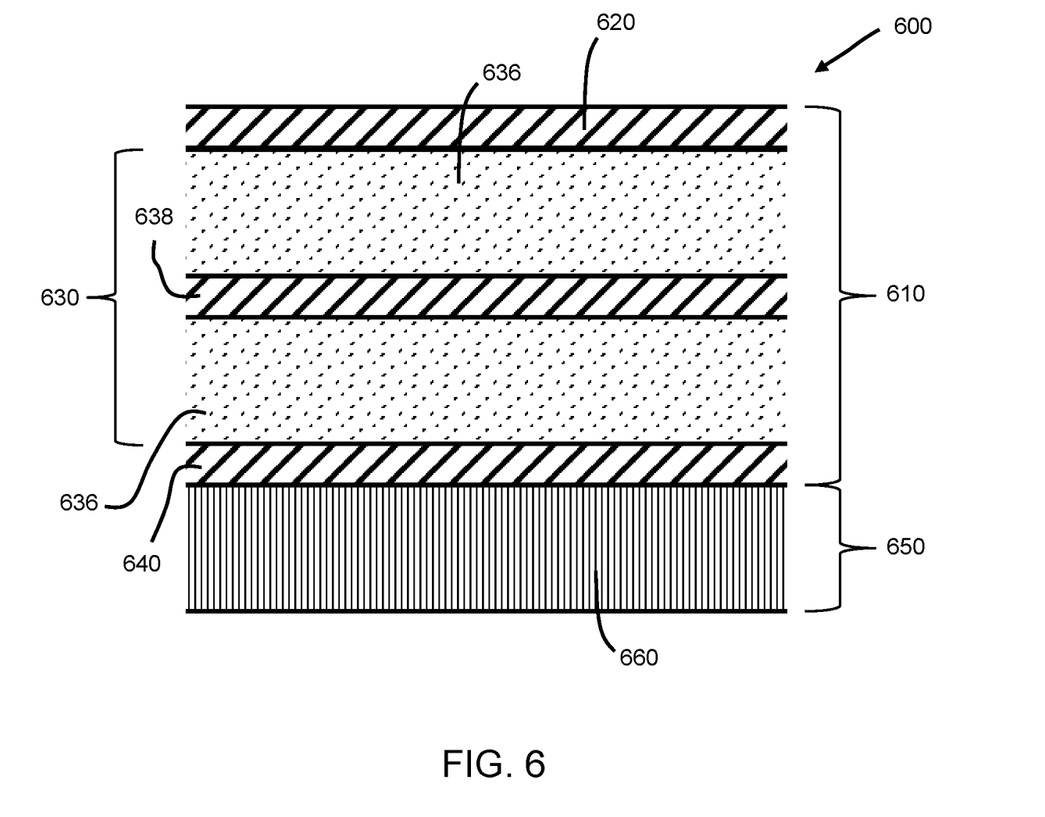
FIG. 6 is a cross-sectional schematic view of a portion of a layer structure of a radome according to another embodiment of the disclosure.

FIG. 6 shows another embodiment of the present disclosure including a core with an intermediate core layer 630 including sublayers 636, 638. In certain such embodiments, the core of the radome can be configured as a so-called C-sandwich. The person of ordinary skill in the art will appreciate that a C-sandwich structure typically includes a series of high-permittivity skins alternating with low-permittivity layers; a wide variety of designs for such structures are known in the art, and the person of ordinary skill in the art can adapt them for use in the layered structures described herein. For example, layer structure 600 includes a core 610 and an inner structure 650. The core 610 includes a first core layer 620, a second core layer 640 and an intermediate core layer 630. Further, the intermediate core layer 630 includes several sublayers of varying relative permittivity. For example, as shown, the intermediate core layer includes two sublayers 636 having a comparatively low relative permittivity surrounding a sublayer 638 having a comparatively high relative permittivity. In a preferred embodiment, high- and low-permittivity sublayers alternate, e.g., with differences in relative permittivities of at least 0.4, or at least 0.7, at least 1, or even at least 1.3, between adjacent sublayers. However, other arrangements of the sublayers are also possible. The thickness of a C-sandwich can vary, e.g., in the range of 1 mm to 200 mm.

In the embodiment shown in FIG. 6, the first and second core layers 620, 640 have the same relative permittivity as the comparatively high relative permittivity sublayer 638, and both comparatively low relative permittivity sublayers 636 have the same relative permittivity. However, it is also possible for the relative permittivity of the any or all of the layers and sublayers of the core to be different. As described above, a variety of low-permittivity and high-permittivity materials are known for use in radomes, as described above, and the person of ordinary skill in the art will select appropriate low- and high-permittivity materials for use in C-sandwich structures.

While the illustrated embodiment in FIG. 6 includes an inner structure with a single layer, it should be understood that inner structure 650 could also include multiple layers as shown in FIG. 3. Likewise, although no coatings are included in FIG. 6, a layer structure including a core with various sublayers could include coatings, such as those shown in FIG. 2.

The layer structure as described above and shown in the examples in FIGS. 1-6 may be embodied as a sheet or a panel for subsequent use in constructing a radome. Alternatively, the layer structure may be shaped and incorporated into a radome that is equipped for installation over a radiation-active device, or the layer structure may be incorporated into a radome that is already installed and covering a radiation-active device.

The layer structure as described above and shown in examples in FIGS. 1-6 is useful for constructing radomes for use in a variety of different applications. A radome constructed in accordance with the present disclosure may be used for protecting a variety of types of radiation-active devices, for example including dish antennas and wire antennas. Moreover, radomes constructed in accordance with the present disclosure are useful in various different settings, such as stationary antennas as well as maritime, aviation and military applications. The lightweight design of the layer structure of the present disclosure is particularly advantageous in aviation applications where weight is of particular importance. The layer structure according to this disclosure is exceptionally well-suited for radomes formed on aircraft, and particularly on aircraft structures other than the fuselage, such as the wings and the stabilizers. In accordance with the wide variety of applications that the layer structure of the present disclosure may be used, radomes constructed in accordance with this disclosure may have any of a variety of different shapes. For example, the radome may be in the shape of a geodesic dome, as shown in FIG. 7, or it may have another shape that is more suitable for a particular application, such as an elongated dome, teardrop, ogive, flattened shell, planar, or other shape.

Another aspect of the disclosure is a method for transmitting radiation of a free-space frequency, the method including providing a radome structure as described herein, and operating the radiation-active device to transmit radiation of the free space frequency through the radome structure to reduce loss for proper antenna function.

Similarly, another aspect of the disclosure is a method for receiving radiation of a free-space frequency, the method including providing a radome structure as described herein, and receiving radiation of the free space frequency through the radome structure by the radiation-active device to reduce loss for proper antenna function.

The person of ordinary skill in the art will appreciate that the relative permittivity is a function of frequency, and so the relative permittivities described herein are at the free space frequency of the radiation that the radome is to be used with. In certain embodiments, the free space frequency of the radiation is in the range of 1 GHz-32 GHz. In other embodiments, the free space frequency of the radiation is the range of 1 GHz-94 GHz, corresponding to Q/V or W-band radiation.

A variety of high permittivity layers (relative permittivity 2.3 or greater) and low permittivity layers (relative permittivity less than that of a neighboring high-permittivity layer, e.g., by at least 0.4 or at least 0.7, at least 1, or at least 1.3) are described herein. The person of ordinary skill in the art will appreciate that in certain embodiments as otherwise described herein, each high-permittivity layer has a permittivity of at least 2.5, for example, in the range of 2.5 to 5, or in the range of 3 to 5. And in certain embodiments as otherwise described herein, each low-permittivity layer has a permittivity of no more than 2.2, e.g., in the range of 1 to 2, or in the range of 1.5-2.2, or of no more than 2.

In one example of a layer structure as described herein, a core of the layer structure is formed as an A-sandwich structure using laminate skins surrounding a low-density interior. The skins are composed of an E-glass laminate having a relative permittivity of 4.4 and a density of 110-120 pounds per square foot (PCF). The low-density interior is composed of a honeycomb having a relative permittivity of 1.08 and a density of about 4 PCF. On the inside surface of the core is an inner structure composed of a syntactic film having a relative permittivity of 1.8 and a density of 36 PCF.

Another example of a layer structure according to the present disclosure is shown in the table below. Such a radome would be suitable for use, for example, in aircraft.

| Material | Thickness - inches (mm) | Relative Permittivity | Transmission Loss | Description |
|---|---|---|---|---|
| Urethane Paint | 0.003 (0.076) | 3.00 | 0.030 | Color Topcoat Paint |
| Primer | 0.001 (0.025) | 4.74 | 0.030 | Tie-Prime for Paint |
| Anti-Static Coating | 0.001 (0.025) | 6.00 | 0.060 | Anti-Static Coating |
| Surface Coating | 0.004 (0.102) | 4.39 | 0.020 | Filler for imperfections |
| Film Adhesive | 0.002 (0.051) | 2.67 | 0.010 | Thin Film to Reduce Imperfections |
| Epoxy/4581 | 0.022 (0.559) | 3.37 | 0.010 | A-Sandwich Skin Layer |
| High Density Foam | 0.055 (1.397) | 1.78 | 0.010 | A-Sandwich Intermediate Layer |
| Epoxy/7781 Glass | 0.021 (0.533) | 4.40 | 0.010 | A-Sandwich Skin Layer |
| High Density Foam | 0.110 (2.794) | 1.78 | 0.010 | Low-Dielectric Matching Layer |
| Low Density Foam | 0.060 (1.524) | 1.14 | 0.004 | Very Low Dielectric Matching Layer |
| Film Adhesive | 0.004 (0.102) | 2.67 | 0.010 | Film to protect VLDML from moisture |

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A layer structure of a radome for use with radiation of a free space frequency, the layer structure having an exposed outer surface and an inner surface, the layer structure comprising:
    a core having an inside surface and an outside surface, the outside surface of the core being within 0.75 mm of the exposed outside surface of the layer structure of the radome, the core including a first core layer having a first relative permittivity of at least 2.3 and a second core layer having a second relative permittivity of at least 2.3, the first core layer defining the outside surface of the core and the second core layer defining the inside surface of the core, and an intermediate core layer between the first core layer and the second core layer; and
    an inner structure disposed on the inside surface of the core, the inner structure having an outside surface abutting the core and an inside surface that is exposed, the inner structure including at least one layer, wherein each of the first relative permittivity and second relative permittivity is at least 0.4 greater (e.g., at least 0.7 greater, at least 1 greater, or at least 1.3 greater) than a relative permittivity of any layer in the inner structure.

2. A layer structure of a radome according to claim 1, wherein the outside surface of the first core layer is no more than 0.25 mm from the outside surface of the layer structure.

3. A layer structure of a radome according to claim 1, further comprising a layer of paint or a hydrophobic layer disposed on the outside surface of the core.

4. A layer structure of a radome according to claim 1, wherein each of the first relative permittivity and the second relative permittivity is at least 2.5.

5. A layer structure of a radome according to claim 1, wherein the core has a thickness of at least about 1 mm.

6. A layer structure of a radome according to claim 1, wherein a first inner layer of the inner structure has a relative permittivity of no more than 2.2.

7. A layer structure of a radome according to claim 1, wherein the inner structure has a thickness of at least 0.25 mm.

8. A layer structure of a radome according to claim 1, wherein at least one of the first core layer and second core layer is a layer of optionally-filled resin.

9. A layer structure of a radome according to claim 1, wherein at least one of the first core layer and second core layer is formed of one or more plies of resin-impregnated fabric.

10. A layer structure of a radome according to claim 1, wherein the intermediate core layer has a thickness in the range of $3/16$-$5/16$ of the wavelength of the radiation in the low-permittivity core layer.

11. A layer structure of a radome according to claim 1, wherein the first relative permittivity and the second relative permittivity are at least 0.4 greater than a relative permittivity of the intermediate core layer.

12. A layer structure of a radome according to claim 11, wherein the intermediate core layer is a syntactic film, a structured material such as a honeycomb material, or a low dielectric resin.

13. A layer structure of a radome according to claim 11, wherein the intermediate core layer has a relative permittivity in the range of 1 to 2.

14. A layer structure of a radome according to claim 11, wherein the intermediate core layer has a thickness of at least 1 mm.

15. A layer structure of a radome according to claim 1, wherein the intermediate core layer has a plurality of alternating comparatively high and comparatively low dielectric sublayers, with the sublayers adjacent the first and second core layers being comparatively low dielectric sublayers.

16. A layer structure of a radome according to claim 15, wherein the core has a difference in relative permittivities of at least 0.7 between adjacent layers and sublayers.

17. A layer structure of a radome according to claim 1, wherein the free space frequency of the radiation is in the range of 1 GHz to 32 GHz.

18. A layer structure of a radome according to claim 1, wherein the at least one layer of the inner structure includes a first inner layer and a second inner layer, the first inner layer being adjacent the core and the second inner layer being disposed inward of the first inner layer, wherein the second inner layer has a relative permittivity of at least 0.4 less than (e.g., at least 0.5 less than) the relative permittivity of the first inner layer.

19. A layer structure of a radome for use with radiation of a free space frequency, the layer structure comprising:
    a core having an inside surface and an outside surface, the core including a first core layer having a first relative permittivity of at least 2.3 and a second core layer having a second relative permittivity of at least 2.3, the first core layer being adjacent the outside surface of the core and the second core layer being adjacent the inside surface of the core;

an inner structure disposed on the inside surface of the core, the inner structure having an outside surface abutting the core and an inside surface that is exposed, the inner structure including at least one layer, wherein each of the first relative permittivity and second relative permittivity is at least 0.4 greater than a relative permittivity of any layer in the inner structure, wherein no layer having a thickness of at least 0.75 mm is disposed on the outside surface of the core.

20. A radome for use with radiation of a free space frequency, the radome comprising an enclosed three-dimensional shape with an exposed convex outer surface and an exposed concave inner surface, the enclosed three-dimensional shape including at least one layer structure according to claim 1, wherein the outside surface of the core of the at least one layer structure forms the exposed convex outer surface of the radome and the inside surface of the inner structure of the at least one layer structure forms the exposed inner concave surface of the radome.

* * * * *